(12) United States Patent
Brown et al.

(10) Patent No.: US 6,989,037 B2
(45) Date of Patent: Jan. 24, 2006

(54) CARPET TILE RENEWAL PROCESS AND PRODUCTS

(75) Inventors: Robert S Brown, LaGrange, GA (US);
Kenneth B Higgins, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 41 days.

(21) Appl. No.: 10/436,227

(22) Filed: May 12, 2003

(65) Prior Publication Data

US 2003/0203116 A1 Oct. 30, 2003

Related U.S. Application Data

(62) Division of application No. 09/874,859, filed on Jun. 5, 2001, now Pat. No. 6,586,053.
(60) Provisional application No. 60/211,362, filed on Jun. 13, 2000.

(51) Int. Cl.
*B05D 3/00* (2006.01)

(52) U.S. Cl. .................. 8/495; 8/478; 8/499; 8/929; 427/389.9; 427/393.4; 428/96

(58) Field of Classification Search .............. 8/478, 8/495, 499, 929, 441; 427/389.9, 393.4; 428/96
See application file for complete search history.

(56) References Cited

U.S. PATENT DOCUMENTS

| | | |
|---|---|---|
| 1,885,468 A | 11/1932 | Miller |
| 2,729,536 A | 1/1956 | Pull et al. .................. 8/148.3 |
| 2,988,149 A | 5/1961 | Brakel .......................... 134/84 |
| 3,046,774 A | 7/1962 | Glock ............................. 68/39 |
| 3,333,291 A | 8/1967 | Hondzinski ................. 15/302 |
| 3,338,422 A | 8/1968 | Haverburg ................... 15/308 |
| 3,574,526 A | 4/1971 | Bell ........................... 8/149.1 |
| 3,685,953 A * | 8/1972 | Cuvelier ....................... 8/115 |
| 3,898,213 A | 10/1972 | Mann, Jr. ................ 68/205 R |

(Continued)

FOREIGN PATENT DOCUMENTS

| | | |
|---|---|---|
| DE | 3429 049 | 2/1976 |
| DE | 32 23 917 A1 | 12/1983 |
| DE | 200 04 811 | 5/2000 |
| EP | 0 662 541 A2 | 12/1995 |
| GB | 2 038 710 A | 7/1980 |
| JP | 01224067 | 7/1989 |
| JP | 5-331759 | 12/1993 |
| JP | 09078443 | 3/1997 |
| WO | 97/06393 | 2/1997 |
| WO | 98/09807 | 12/1998 |
| WO | 01/96652 | 12/2001 |

*Primary Examiner*—Margaret Einsmann
(74) *Attorney, Agent, or Firm*—Terry T. Moyer; Daniel R. Alexander

(57) ABSTRACT

Refurbishing and/or renewing cut or loop pile carpet products including carpet tiles by passing the product under a high pressure water or liquid dispensing head projecting a stream of water against the subject product at a pressure in the range of 100–2000 p.s.i.g. Improvements to such methods include adding a polymer backing layer to the tile, pre-bulking the face yarns, and/or chemically treating the face yarns.

7 Claims, 9 Drawing Sheets

U.S. PATENT DOCUMENTS

| | | | |
|---|---|---|---|
| 3,902,452 A | | 9/1975 | Queen et al. .................. 118/56 |
| 4,005,230 A | | 1/1977 | Fleissner .................... 427/354 |
| 4,103,389 A | | 8/1978 | Resnick et al. ............... 15/302 |
| 4,288,929 A | | 5/1981 | Sorensen et al. .............. 8/151 |
| 4,301,577 A | * | 11/1981 | Mueller et al. ............... 26/2 R |
| 4,522,857 A | | 6/1985 | Higgins ....................... 428/95 |
| 4,578,132 A | * | 3/1986 | Van Uden et al. ............ 156/72 |
| 4,649,608 A | | 3/1987 | Fay ............................ 26/15 R |
| 4,740,214 A | * | 4/1988 | McBride et al. ............... 8/561 |
| 5,096,747 A | | 3/1992 | Scholla et al. .............. 427/299 |
| 5,380,561 A | | 1/1995 | Dorn ........................ 427/430.1 |
| 5,381,592 A | * | 1/1995 | Higgins ........................ 28/100 |
| 5,457,845 A | * | 10/1995 | Higgins et al. ................ 15/302 |
| 5,540,968 A | | 7/1996 | Higgins ........................ 428/95 |
| 5,545,276 A | | 8/1996 | Higgins ........................ 156/79 |
| 5,762,650 A | | 6/1998 | Ruggiero et al. ............... 8/490 |
| 5,763,001 A | | 6/1998 | Brown ....................... 427/140 |
| 5,948,500 A | | 9/1999 | Higgins ........................ 428/95 |
| 6,203,881 B1 | | 3/2001 | Higgins ........................ 428/95 |
| 6,588,053 B1 | | 7/2003 | Brown et al. ............ 427/389.9 |

* cited by examiner

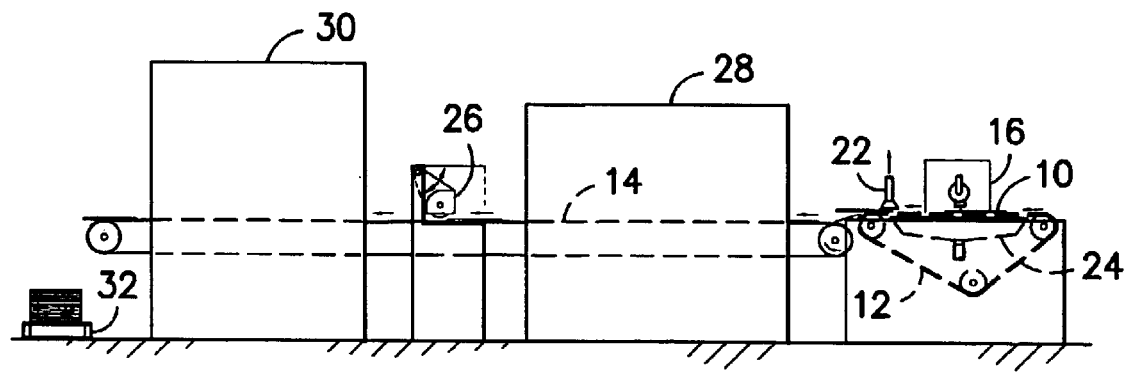
FIG. —1—
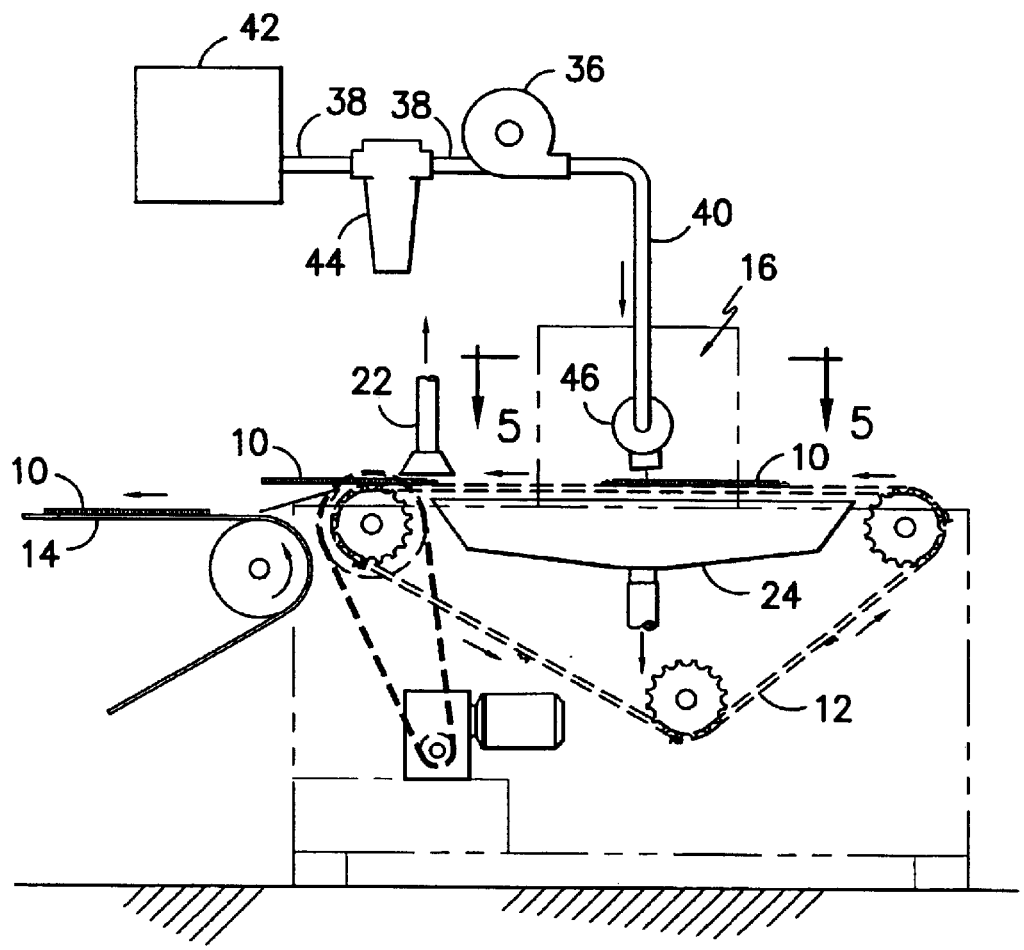
FIG. —2—

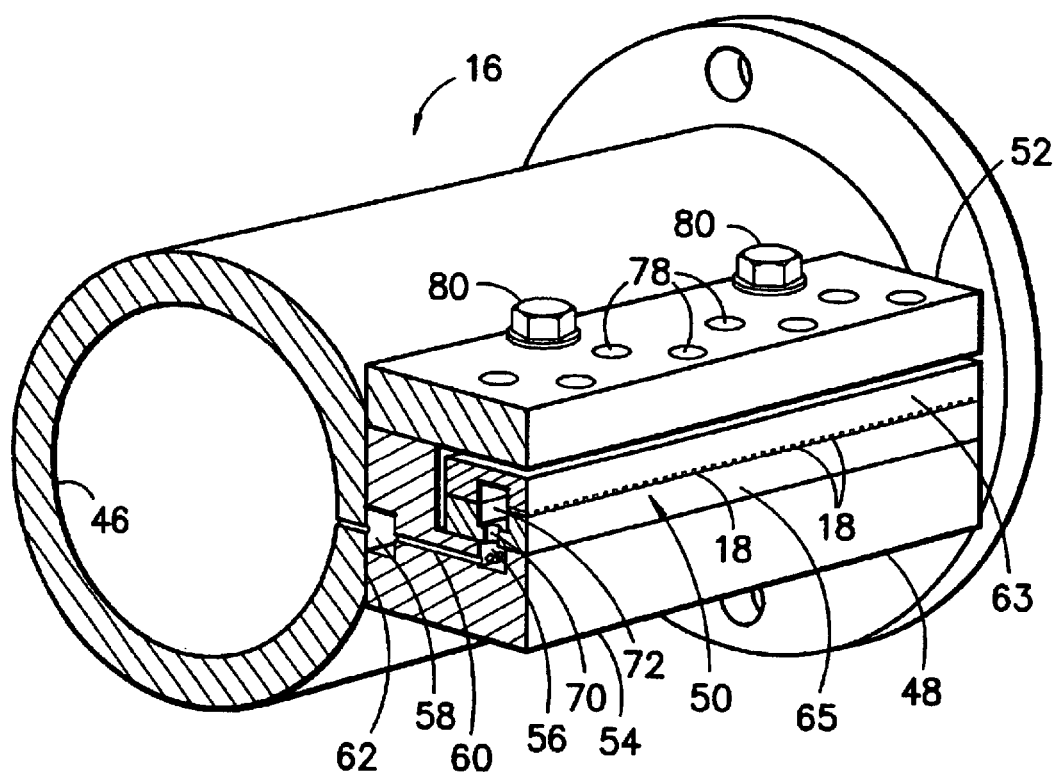
FIG. -3-

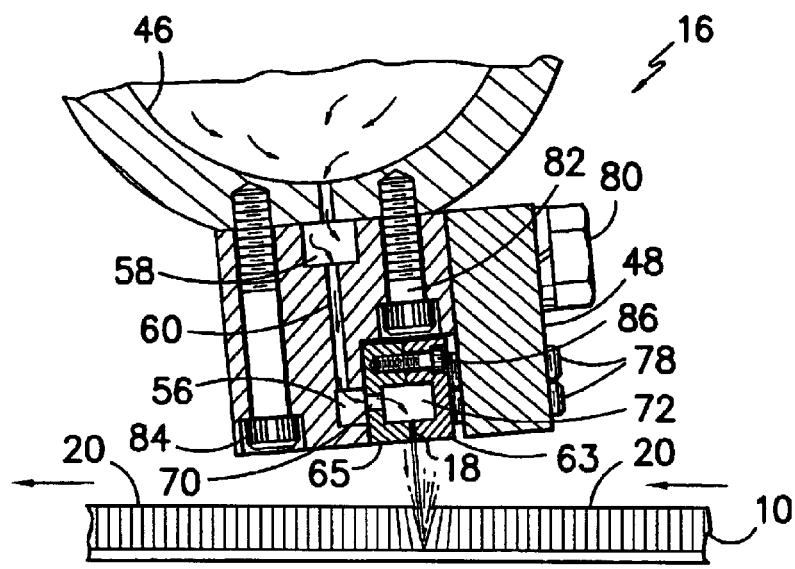
FIG. -4-
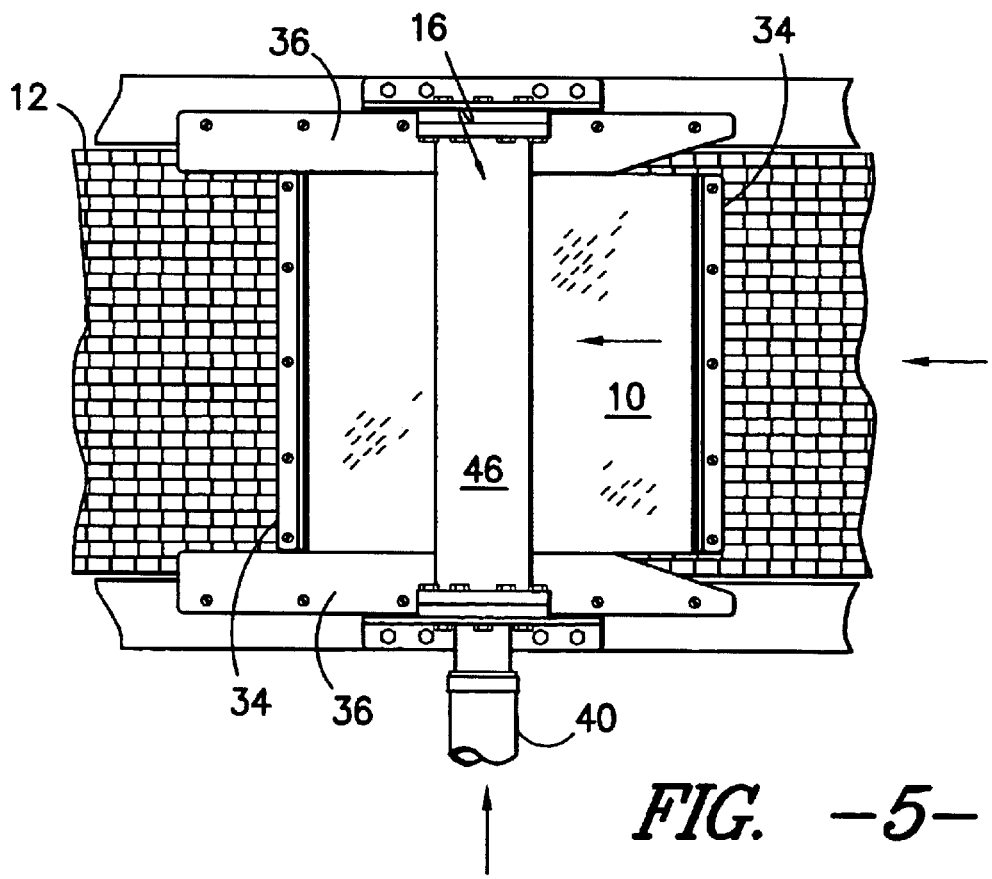
FIG. -5-

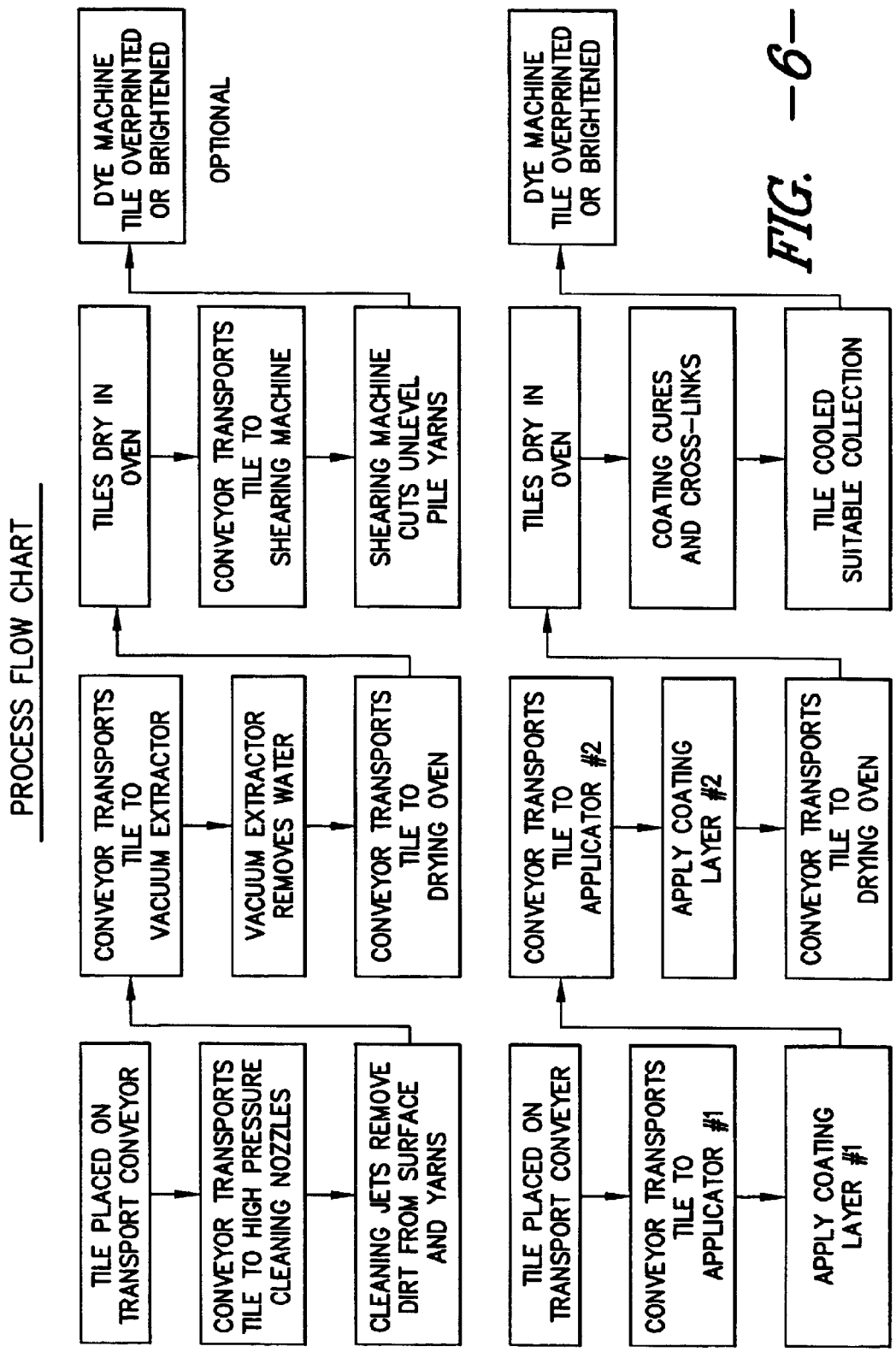

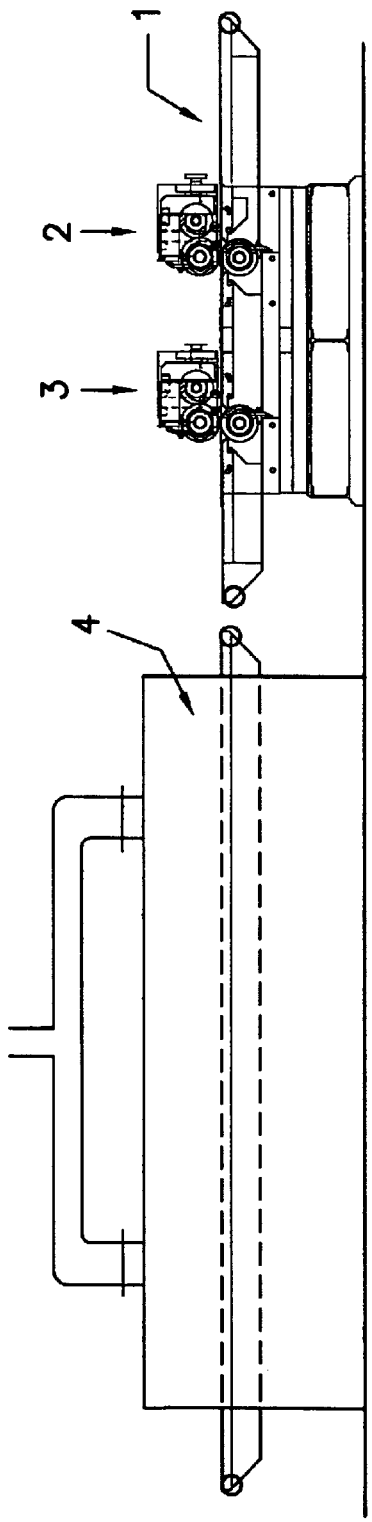
FIG. -7-
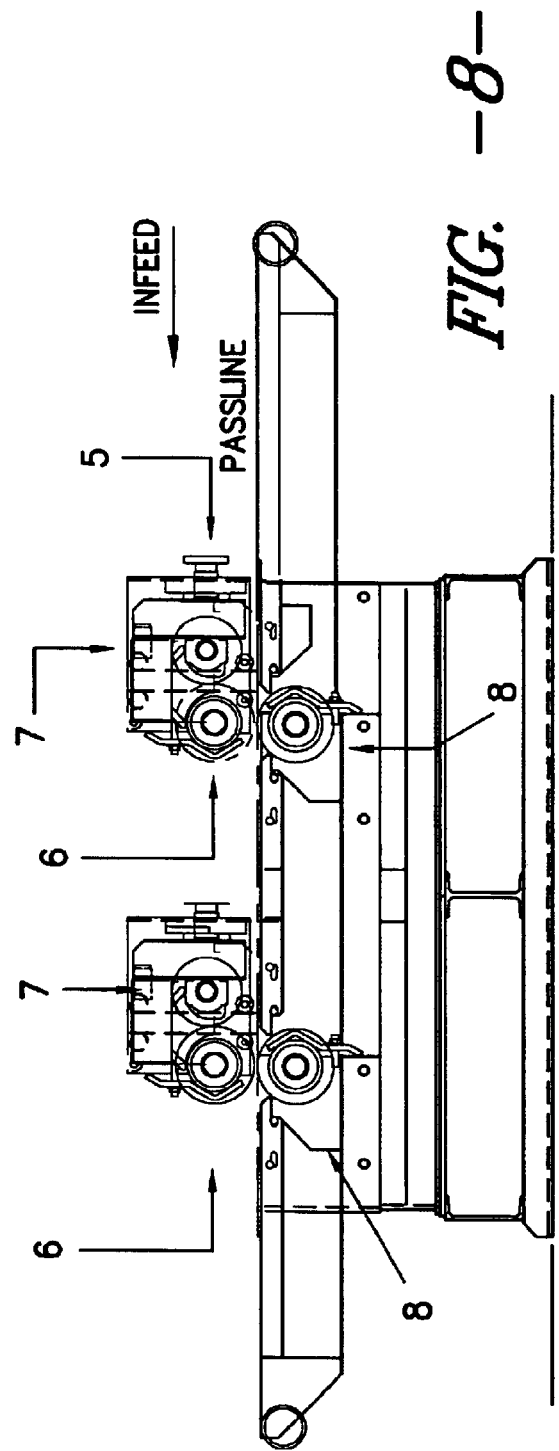
FIG. -8-

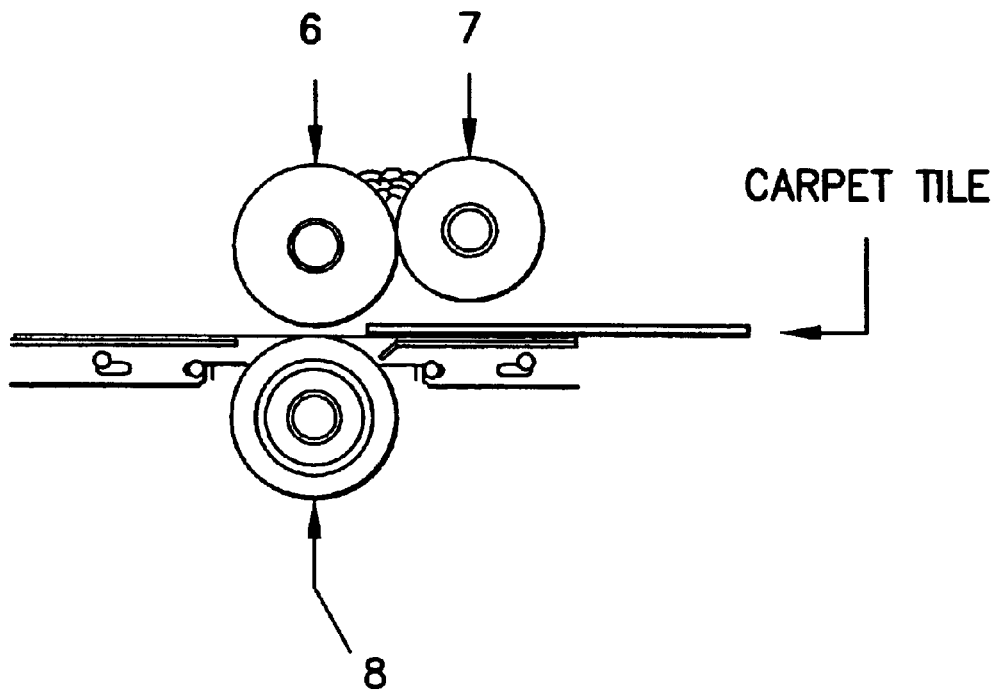
FIG. -9-
COATING ROLL - 30 DURO "A" HARDNESS
MACHINE GROOVED TO 32 TPI
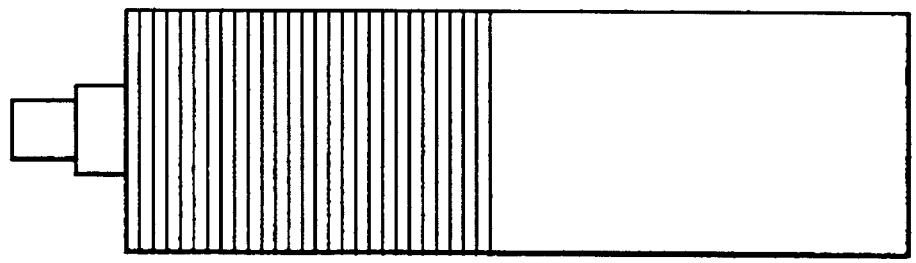
FIG. -10-

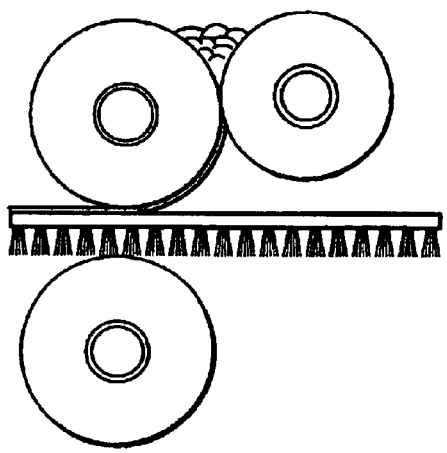
FIG. -11-
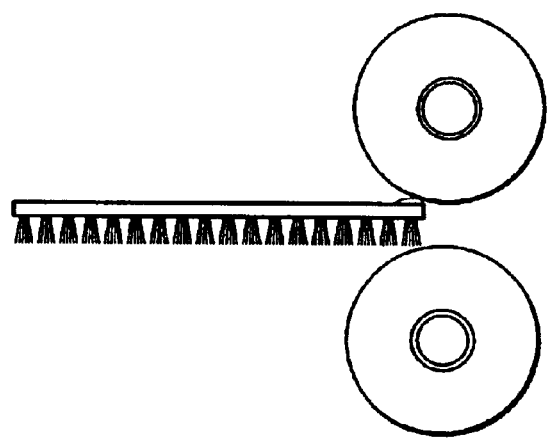
FIG. -12-
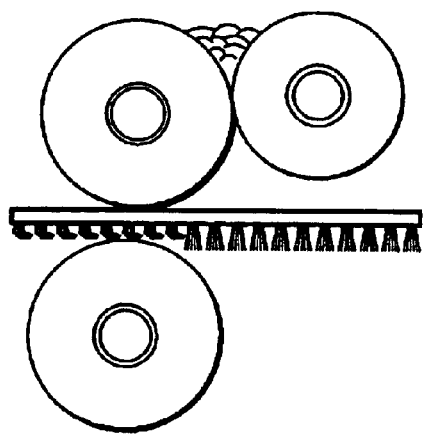
FIG. -13-

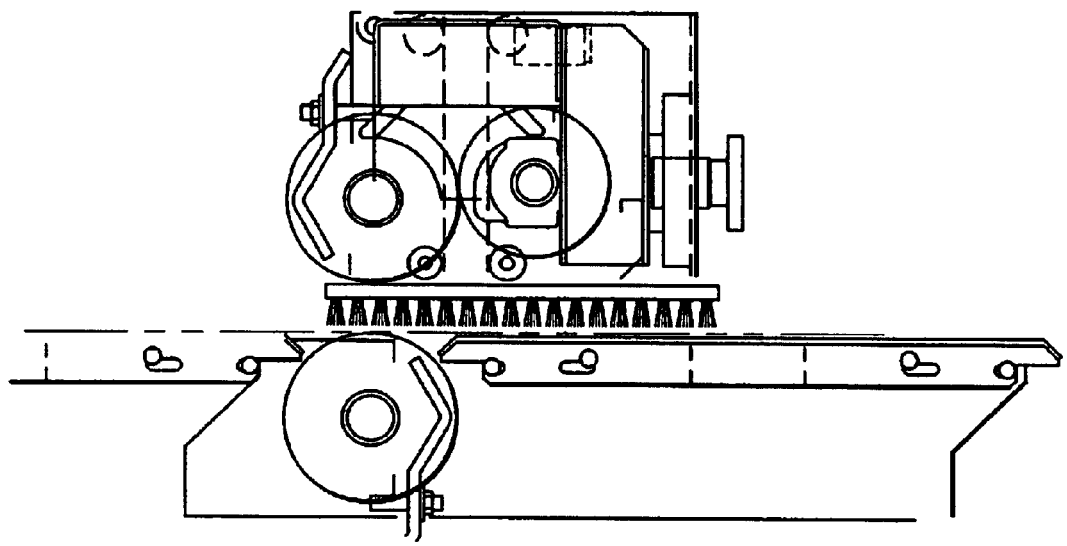
FIG. -14-
FIG. -15-

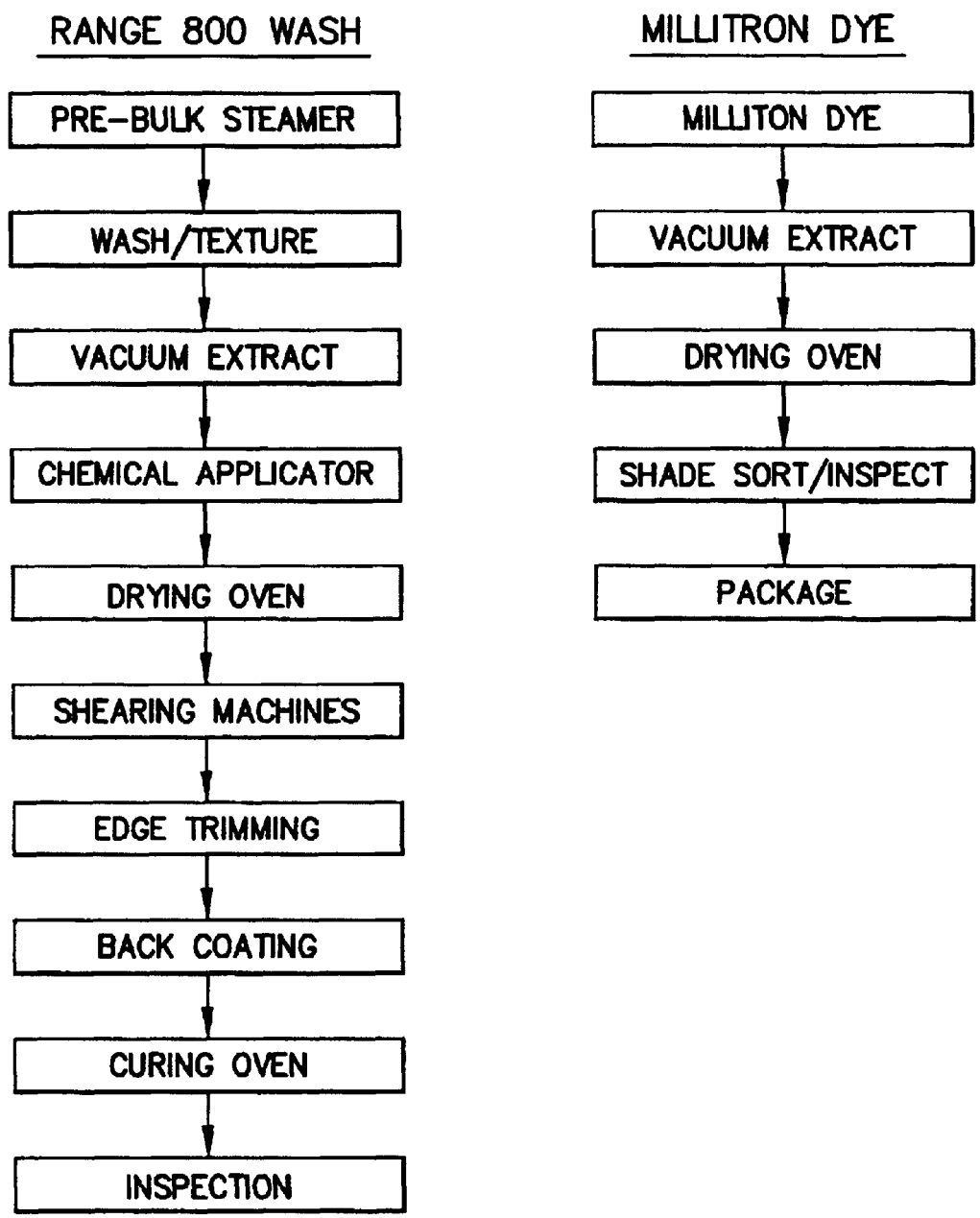
FIG. —16—

CARPET TILE RENEWAL PROCESS AND PRODUCTS

CROSS-REFERENCE TO RELATED APPLICATIONS,

This application is a divisional of U.S. patent application Ser. No. 09/874,859, filed Jun. 5, 2001, now U.S. Pat. No. 6,586,053 which claims priority to U.S. Provisional Application Serial No. 60/211,362 filed Jun. 13, 2000, the teachings of all of which are hereby incorporated by reference herein in their entirety.

BACKGROUND OF INVENTION

This invention relates generally to the refurbishment of pile carpet, especially carpet tiles, to provide extended wear life without a detrimental affect on the surroundings due to a reduced aesthetic effect by the existing pile carpet due to dirt and/or matting of the pile on the face of the tile. More particularly, this invention relates to a method and apparatus for treating the pile face and/or applying a new layer of material to the back surface of a refurbished carpet tile to create a new like appearance for the back surface of the tile.

As described in U.S. Pat. Nos. 5,381,592 and 5,457,845 hereby incorporated by reference, in the past it has been necessary to replace pile carpet when it became dirty, develops a change in texture in some areas and/or is matted down due to traffic and/or furniture thereon. The replacement of such carpet is expensive due to the price of new carpet and has to be matched to the existing environment. This replacement of carpet, especially carpet tiles, in commercial establishments is an expense which, if it can be avoided, will free up money which can be used for other desirable purposes.

The above described U.S. Pat. Nos. 5,381,592 and 5,457,845 provide a method and apparatus to refurbish cut and loop pile carpet and eliminate the cost of replacement of such tile with new carpet.

In particular, they describe a system wherein pile carpet tiles are refurbished. The invention is directed in general to pile carpet, cut or loop, but is primarily directed to carpet tiles since these are used in commercial establishments and generally receive more wear due to traffic by pedestrians thereon and therefore tend to mat and get dirty quicker than residential carpet. The carpet tiles are usually in 18 inch squares and have pile yarns, cut or loop, like that shown in U.S. Pat. No. 4,371,576 hereby incorporated by reference. As shown in FIG. 1, the carpet tiles 10 are treated on cooperating conveyors 12 and 14 but, obviously, one continuous conveyor could be used, if desired.

BRIEF DESCRIPTION OF THE DRAWINGS

FIGS. 1 and 2 schematically illustrate an exemplary apparatus for carpet refurbishment;

FIGS. 3–5 illustrate an exemplary high pressure fluid delivery unit;

FIG. 6 is a flow chart setting forth steps of an exemplary refurbishment process;

FIGS. 7–10 illustrate an exemplary apparatus for coating application on a carpet;

FIG. 11 illustrates a coating process utilizing a high viscosity coating material;

FIG. 12 illustrates a coating process utilizing a low viscosity coating material;

FIG. 13 illustrates a coating process resulting in distorted pile face yarns;

FIG. 14 illustrates a coating roll arrangement using soft applicator rolls;

FIG. 15 illustrates a coated refurbished carpet treated by the arrangement of FIG. 14; and FIG. 16 is a flow diagram setting forth exemplary steps for a comprehensive refurbishment and dyeing process.

Briefly, the system of FIGS. 1 and 2 will be described with the description being directed to a cut pile carpet tile 10. The dirty and/or matted carpet tile 10 is placed on the conveyor 12 where it is initially conveyed under a source of high pressure cleaning liquid or water, generally designated 16, whereat liquid, such as water, is supplied at a pressure within the range of 200–2000 p.s.i.g., preferably 300–1200 p.s.i.g. In one example, the liquid is supplied at a pressure of about 800 p.s.i.g. from the nozzles 18 and impinges on the carpet tile. It is contemplated that an elongated slot can be used rather than the disclosed nozzles 18 so long as the liquid pressure is maintained in the desired range. The high pressure liquid from the jets clean the dirt from the surface and between the yarns 20 of the carpet tile while at the same time removing the twist from the yarn and causing them to upright themselves. From the high pressure water source 16, the carpet tiles pass under a vacuum extractor 22 to remove water therefrom. Also, located under the conveyor 12 is a water sump collector 24 to recover the water from the water source 16.

Since the high pressure water from the nozzle 18 removes the twist from the yarn 20, if the yarn 20 has twist therein, or lifts and straightens yarn which has no or very little twist therein, the surface of the upright yarns tends to be uneven. So the carpet tiles, after being deposited on the conveyor 14 are conveyed to a shear 26, after passing through a dryer 28, to even out the pile height of the yarns 20. If desired, the carpet tiles 10 can be over-printed or brightened by a dye machine 30 prior to being collected on a pallet 32. The dye machine can be of any suitable type but is preferably a computer controlled jet type such as that shown and disclosed in U.S. Pat. No. 4,993,242 hereby incorporated by reference.

The above description is directed to a cut pile carpet but obviously the above system can be employed to clean and de-mat a loop pile carpet tile. One approach, includes cutting of the loops in the loop pile product and then treating it as a cut pile carpet tile as described above. Another approach is to pass the loop pile carpet tile under the high pressure water source as described above but pivot the shear 26, as shown, upwards away from the conveyor 14 as it passes downstream.

To properly maintain the carpet tiles in spaced relationship a plurality of slats 34 are connected to the conveyor 12 and/or 14. As the tiles 10 are conveyed under the high pressure water source a chambered guide bar 36 mounted on both sides of the conveyor guides the carpet tile into position under the water source 16 as the slats 34 pass under the guide bars. This same arrangement can be used on the conveyor 14 as the carpet tiles pass under the shear 26 and the dye machine 30. The slats 34 and the guide bars 36 serve the further function of maintaining the fibers on the edges of the tile in an upright condition as the liquid impinges thereon so that further operations downstream will treat them as well as the other yarn in the body of the tile. This prevents the edge fibers from being bent over and giving a ragged appearance to the carpet tile after cleaning thereof.

FIG. 2 depicts an overall view of the apparatus to apply high pressure water to the carpet tiles, which is depicted as numeral 16, which is characterized in more detail in FIGS.

3 and 4. Pump 36 is used to pump, via suitable conduits 38 and 40, a working fluid such as water from a suitable source of supply 42 through an appropriate filter 44 to a high pressure supply duct 46, which in turn supplies water at suitable dynamic pressure (e.g., between 200 p.s.i.g. to 2000 p.s.i.g.) to the apparatus 16. The fluid thereby emanates from the apparatus 16 thereby striking the carpet tile 10 placed on the conveyor 12.

Looking to FIG. 3, it may be seen that the high pressure water source 16 is comprised of three basic structures: a high pressure supply gallery assembly 48 (which is mounted in operable association with the high pressure supply duct 46), slotted chamber assembly 50 and clamping assembly 52.

Supply assembly 48 constitutes an "L"-shaped member, into one leg of which is machined a uniform notch 56 which extends, uninterrupted, along the entire length of the apparatus 16. There is a rectangular uniform notch 58 which is in the other vertical leg of the "L"-shaped member 54 and adjacent to the high pressure supply duct 46. A series of uniformly spaced supply passages 60 are drilled through the rectangular uniform notch 58 and extend to the corresponding side wall of notch 56, whereby notch 56 may be supplied with high pressure water from high pressure supply duct 46, the side of which may be milled, drilled, and connected to notch 58 which is along the side wall 62 of the assembly 54. Slotted chamber assembly 50 is comprised of dual elongate "U"-shaped members 63, 65 having a rectangular cross-section therebetween. The upper "U"-shaped member 63 has a series of machined closely spaced slots which form the nozzle 18, each having a width approximately equal to the width of the desired high velocity treatment stream.

Referring now to FIGS. 3 and 4, grooved chamber assembly 50 is positioned, via clamping assembly 52, within supply gallery 54 so that its rectangular cross-section communicates via parallel spaced holes 60 to notch 56 which thereby forms both an upper and lower high pressure distribution reservoirs, respectively, so that fluid enters from a supply duct 46 and then into a high pressure distribution reservoir formed by notch 58. The water then travels via supply passages 60 into a lower high pressure distribution reservoir formed by notch 56 and then goes through holes 70 into an upper high pressure distribution chamber 72 formed by dual elongate "U"-shaped members 63 and 65. Water then flows through slots 18 towards the carpet tile 10. Clamping assembly 52 is provided along its length with jacking screws 78 as well as bolts 80 which serve to securely attach clamping assembly 52 to supply gallery assembly 48.

As shown in FIG. 4, the high pressure water source 16 is connected to the high pressure supply gallery assembly 48 by means of bolts 82 and 84 respectively. There are a series of bolts 86 which connect the lower "U"-shaped member 65 with the upper "U"-shaped member 63.

The means of eliminating dirt and mats from the carpet tiles involves the nozzles 18. In the preferred embodiment, there are forty nozzles per inch, but this can vary. Instead of having all of the slots parallel to each other, the nozzles between one lateral edge of the member 63 are at an angle from the longitudinal axis of the member 63. The angle deviation from the longitudinal axis of the member 63 that provides good results is five degrees. This angle can vary widely, with the optimal deviation angle depending on the type of fabric utilized.

In accordance with the present invention, the pile face yarns of used carpet tile, or other flooring, is cleaned and re-textured using the above described methods and apparatus. After drying in a conventional oven, a thin layer of modified acrylic material is applied to the back surface of the refurbished carpet tile using roll applicators, thereby creating a new appearance, a new coated product, and refurbishing the back of the used tile.

The tile is subsequently dried in an oven to remove water and cross-link the acrylic polymer. The acrylic-coating layer when cross-linked, bonds to the original tile back and is highly resistant to chemical plasticizers commonly used for PVC backed carpet tile. The new backing layer forms a protective or blocking layer against plasticizer migration, thereby providing unique product attributes for refurbished carpet tile. Tiles may be re-colored using a textile dyeing or pattern process without adversely effecting the renewed tile back.

In accordance with a preferred embodiment of the present invention, two (2) top roll applicators are used to apply a thin layer of material (approximately 2.0 mm) to the back of the cleaned tile. The applicators are modified to use soft grooved coating rolls (40 durometer shore hardness) and thereby to achieve low coating weights. Depending on the type of carpet tile, approximately 0.50–1.0 oz of coating material per square yards is applied to the back of the carpet tile during the renewal process.

A low temperature cross-linking agent allows the backing or coating to dry and cross-link at 175° F., thereby avoiding damage to the underlying PVC backing materials by overheating.

The following patents are hereby incorporated by reference:

| Patent No. | Description | Date |
| --- | --- | --- |
| 5,381,592 | Method to Refurbish Carpet Tile | Jan. 17, 1995 |
| 5,457,845 | Apparatus to Refurbish Carpet Tile | Oct. 17, 1995 |
| 4,808,191 | Process for Pattern Dyeing of Textile Material | Feb. 28, 1989 |
| 4,740,214 | Process for Pattern Dyeing of Textile Material | Apr. 26 1988 |

Although various methods and apparatus for cleaning and reconditioning articles with pile fibers may be used, the present invention is especially adapted for use with methods and apparatus described in above mentioned U.S. Pat. Nos. 5,381,592 and 5,457,845. These methods and apparatus have been shown to be effective in removing dirt and/or matting of pile face yarns from used carpet tile. Other methods and apparatus for cleaning and reconditioning pile articles may work for particular articles, but they are not usually practical for refurbishing used carpet tile, which are essentially flat articles. In cases where another device or method can be adapted for carpet tile, the typical cleaning pressures employed are found to be too low to achieve the desired yarn re-texturing and removal of dirt and/or matting of the pile face yarns.

Notwithstanding the success of the methods and apparatus of the above referenced patents at cleaning and refurbishing the top of the carpet tile, such are improved by adding a method to effectively clean and refurbish the back surface of the used tile. It is common that the back surface of used carpet tiles are dirty and often coated with layers of old installation adhesives. These materials are typically water insoluble and difficult to remove using conventional methods. Residual adhesives and embedded dirt or floor materials often remain on the back surface of the tile after the prior refurbishment treatment, thereby making refurbished carpet tile difficult and to re-install. Customers often object to the appearance and condition of the back surface, essentially viewing the product as a used carpet. In the past, refurbished carpet tile was not acceptable to some customer for this reason alone.

These same conditions cause difficulties in processing tiles through the refurbishment treatment. The conditions increase the number of rejects and reduce the product yields, thereby making the process more costly. In worst case situations, particular used carpet tile can not successfully be refurbished due to the condition of the tile backing.

It is object of this invention to provide an improved carpet tile refurbishment process whereby after cleaning and re-texturing the pile face yarns of used carpet tile, a new layer of material is applied to the back surface of the tile, thereby renewing the back of the used carpet tile.

With respect to the prior art, no apparatus or method is provided to clean or refurbish the back surface of the tile. Renewing the back surface of the tile in accordance with the present invention provides the benefits listed below. The unique attribute of the applied material to resist chemical plasticizers provides product benefits and features for new and/or refurbished PVC carpet. The material applied to the back of the tile is novel in that the material bonds to all materials commonly used in carpet tile backing systems, to PVC and polypropylene backs. Further, the material is unique in that is provides high resistance to steam and water, and is compatible with adhesives used to install carpet tile.

Benefits

1. Improved aesthetics—both surfaces of the used carpet tile are refurbished. The product is more generally acceptable to more customers.
2. Ease of Installation—the renewed backing layer covers over residual adhesive and embedded dirt or other material, thereby facilitating re-installation of used tile after refurbishment.
3. Lower rejects and improved process yields over the prior process.
4. Coating material that when applied to back surface of new or used tile provides high resistance to chemical plasticizers commonly used for PVC carpet tile. The new backing layer forms a barrier layer against plasticizer migration, a problem common to PVC product, that can result in much higher expenses for carpet tile installation.
5. Coating material that provides high resistance to steam and water, thereby making it possible to dye refurbished carpet tile by conventional textile dyeing methods.
6. Coating material that is compatible with commonly used installation adhesives.
7. Coating material that bonds all known commercially used carpet-backing materials including polypropylene and PVC backing.
8. Coating material that is low in VOC and therefore meets or exceeds industry standards for indoor air quality for carpeting.

Other acrylic polymers and cross-linking agents may provide similar or like results. Certain polyurethane materials may be suitable for the backing renewal of used carpet tile, but in general tend to be more expensive than modified acrylic polymers.

Other application devices may be used to apply the coating material. These methods include rod or engraved roll applicators, used either as a single applicator or as multiple applicators.

Different thickness and weights of materials may be applied to the back surface of the tile.

The following is a preferred embodiment of the process of the present invention:

Backing Renewal Process

| Process Step | Apparatus |
| --- | --- |
| 1. Wash/Re-Texture Carpet Tile | Wash Unit Apparatus |
| 2. Dry Carpet Tile | Drying Oven #1 |
| 3. Apply Base Layer To Back of Tile | Top Roll Applicator #1 |
| 4. Apply Top Layer to Back of Tile | Top Roll Applicator #2 |
| 5. Dry & Cross-Link Polymer | Drying Oven #2 |
| 6. Cool Tile Back | Cooling Zone #1 |
| 7. Dye Carpet Tile | Dye Machine |

Contemplated Variations & Alternatives

1. The tile backing maybe renewed prior to washing and re-texturing
2. The backing material may be applied with a single applicator and dried, either before washing and re-texturing the tile, or as illustrated above, after the washing and re-texturing step.
3. Other methods may be used to cure or otherwise cross-link the backing polymer including UV, IR or Microwave type devices.

Apparatus—Backing Renewal Process

The overall schematic representation of the carpet tile backing renewal process is shown in FIG. 6 and the apparatus is illustrated in FIG. 7. After washing and re-texturing, tiles are placed on a belt conveyor 1 with the pile face yarns lying down. The tile is transported through the first coating applicator 2 whereby a thin layer of the modified acrylic is applied to the back surface of the tile. The tile is next conveyed through a second applicator 3 that applies an additional layer of material over the first coated layer. The tile is then conveyed into a drying oven 4 wherein the coating is dried, allowing the polymeric acrylic to cross-link and permanently bond to the old backing.

A larger scale view of the coating applicator is illustrated in FIG. 8. In the preferred embodiment of the apparatus, a common belt transport 1 is used to convey tiles under two direct roll applicators, 2 and 3. A mechanical adjustment 5 allows the height of applicator roll 6 to be accurately set to contact the back surface of the tile. The distance between applicator roll 6 and a fixed conveyor roll 8 is adjustable and set to a minimum distance to allow the tile to pass through the gap without crushing the pile yarn while maintaining contact with the applicator roll 8. The arrangement is illustrated in FIG. 9.

As illustrated in FIG. 9, a meter roll 7 precisely controls the quantity of material transferred to the applicator roll 6 thereby providing accurate method to control the amount of coating applied to the back surface of the tile. New material is continuously supplied into the reservoir formed between the applicator roll 6 and metering roll 7.

Each applicator roll 6 applies a thin layer of material, approximately 0.5 mm–2.5 mm, preferably 1.0 mm–1.5 mm to the back surface of the tile. In the optimum configuration, each applicator roll 6 is covered with a soft EPDM polymer or similar material of 30 Duro-A hardness, thereby to avoid crushing or distorting the refurbished pile yarns of the tile.

As illustrated in FIG. 10, typically each applicator roll is machine grooved at 32 turns per inch, necessary to achieve the desired coating weight, nominally 40 GMS/SQ. YD for each of the two application steps. The actual number and pattern for grooving the applicator roll and shore hardness may vary depending on the viscosity of coating material and other factors related to the release property of the coating. Metering rolls 7 and the fixed conveyor or gap rolls 8 are typically steel rolls, smooth ground, chrome plated and polished for extended roll life.

A conventional forced air oven equipped with a transport apron is used for drying and cross-linking the coated material. In the preferred embodiment of the process, the back surface of tile is heated to 175° F. for approximately 90 seconds to allow a sufficient bonding of the new backing material layer and cross-linking of the modified acrylic material.

With respect to the prior art, the back surface of used carpet tile are not presently treated or renewed during the refurbishment process. Notwithstanding that a variety of coating applicators are commercially used to apply coating to textile materials, the requirements for coating the back surface of individual carpet tile are specific and unique; and therefore commercial coating equipment and methods have not heretofore been developed for this purpose.

The above-described apparatus of the present invention provides a practical and suitable means to apply a new surface to the back of refurbished carpet tile with the following benefits and advantages:

1. The apparatus provides a means to apply a new surface to the back surface of the tile without the coating material contaminating the pile face yarns, which would otherwise cause the refurbished tile to be unusable. The method is essentially based on applying multiple layers of high viscosity acrylic coating at high solids contents to avoid migration of the coating to the pile yarns. The use of direct roll applicator in particular provides suitable means to apply a thin layer of material to the back of the tile. The use of multiple roll applicators, in tandem, provide a means to sequentially build up the coated layer without contamination of the pile yarns.
2. The apparatus provides a means to coat the back surface of the tile without crushing or distorting the pile face yarns which would otherwise distort or change the appearance of the product, or cause the tile to dye unlevel during the dyeing process. The apparatus and use of soft coating rolls provides a means to precisely apply a new coating using minimum contact pressures, thereby the apparatus is well suited to carpet tile, as well as other pile textile articles.
3. The apparatus provides a means to achieve sufficient coating weights through the use of grooved coating rolls which increase the quantity of material applied by the applicator roll, thereby providing uniform coverage of the coating material to the back surface of the tile.
4. The use of a common conveyor provides the benefits for easy setup and avoids defects that often occur when coated tile is transferred over multiple conveyor systems prior to drying.

Additional Variations or Alternatives

Notwithstanding the benefits and advantages described above, and depending on the properties of coating material(s), the following alternative apparatus or arrangements may be suitable for the present backing renewal process.

1. Separate applicators may be used in-lieu of a tandem arrangement of applicators and common transport arrangement, or other tile transport arrangements (e.g. rolls) can be used to convey tile through the applicators.
2. Various other types of applicators, such engraved steel rolls, knife over roll or rod applicators, extruders, or sprayers can be used to apply coating materials to the back surface of the tile. The exact number and type of applicators, are largely dependent on the characteristics and nature of the materials used to coat the back tile surface.
3. Other methods may be used to dry and/or cross-link the coated tile including indirect heating methods such infrared or steam heated plates.
4. Depending on the desired amount of coating applied to the back surface and characteristics of the coating material, various roll hardness factor and grooving patterns may be used to achieve higher or lower coating weights.

The overall schematic for the cleaning and backing process is illustrated in FIG. 6.

In the preferred embodiment of the invention, a series of direct roll applicators adapted to coat carpet tile, are used to sequentially apply one or more, preferably several thin layers of a polymer, preferably a modified acrylic polymer to the back surface of the tile. This acrylic coating material is formulated to maintain a sufficiently high viscosity (3,000–6,000 CPS) to avoid problems with coating material that would otherwise contact or migrate to the pile face yarns and cause defective product. Notwithstanding that viscosity measurements depend on the rheology of the material, at a relative higher viscosity (>6,000 CPS) these coatings formulations do not produce a uniform film to adequately cover over residual adhesives and other materials typically found on the back surface of the carpet tile.

A second problem associated with applying a new coating material or layer to the back surface of the tile is that the quantity and layer thickness of the new coating is strictly limited by the build up of excessive coating material at the tile edges. This problem, commonly referred to as "dub-over", causes tiles to have an unleveled back surface; and since a level or flat surface is required for installing carpet tile, again the problem results in defective product. The quantity of material that can be applied, using a single applicator without excessive coating build up on the edges of the tile, is not sufficient to produce a uniform film or layer that covers over old adhesives remaining on the back surface after the cleaning process.

The above-mentioned problems and technical challenges are illustrated in FIG. 11 and FIG. 12, respectively. It is generally found that increasing viscosity, thereby to minimize the problem of coating contacting the pile face yarns (FIG. 11) causes increases the severity of the "dub-over" problem. Likewise, lowering the viscosity, thereby reducing the "dub-over" problem (FIG. 12), increases the severity of the problem of coating contacting the pile face yarns.

As will become apparent, the objective and benefits of the present backing renewal process also address other problems and factors related to refurbishing used carpet tile.

The above-described problems are overcome through the use of a series of direct roll applicators to sequentially apply one-or more, preferably two thin layers (approximately 1.0 mm–1.5 mm) of coating material to the back surface of the tile. While coating material may be dried between individual application steps, in the preferred embodiment of the backing renewal process, the use of a water based material formulated at a sufficiently high solids content (approximately 45%–55%) makes intermediate drying unnecessary, providing the obvious benefits of lower cost and energy savings.

Other benefits and advantages are less obvious, but important. As illustrated in FIG. 13, prior attempts to apply coating materials to the back surface of carpet tiles have often resulted in distortion or damage to pile face yarn requiring additional process steps in an effort to re-bulk the pile face yarns and eliminate the distortion of the pile.

As illustrated in FIG. 14, the preferred embodiment of the invention overcomes this problem through the use of soft coating rolls and a common belt conveyor system that transports tile under the applicator roll. The arrangement significantly reduces the forces placed on the pile face yarns, thereby effectively eliminating crushing or distortion of the pile face yarns.

This arrangement provides a second advantage when applying coatings to used carpet. As previously mentioned, it is normal and typical that layers of residual adhesive remain on the back surface of used tile after the cleaning process. Often, these adhesive layers have embedded dirt, sub-flooring particles and other foreign objects which cause voids or skips when coatings are applied using convention methods and rolls. However, it is found that when multiple thin layers of coating are applied using soft applicator rolls, the applied coating encapsulates and forms a seal around most of the foreign objects. Thereby eliminating the obvious problems creating for processing and installation of the refurbished carpet tile product.

In the preferred embodiment of the present backing process, two applicators are used in sequence to apply individual layers of coating. A drying oven equipped with a transport apron is used to dry and cure the coating materials.

One drawback to the prior refurbishing of used carpet tile was that no effective method or apparatus was provided to renew or otherwise refurbish the back surface of the used carpet tile. It is one object of this invention to provide a method and apparatus to renew the back surface of refurbished carpet tile.

Benefits and Advantages of the Present Process

1. Improved aesthetics, renewing both surfaces of the used carpet tile makes the end product acceptable to customers who otherwise object to refurbished tile because of the condition of the untreated back surface of the tile.

2. The renewed backing layer covers over residual adhesive and embedded material that make the prior product difficult to properly re-install and which detract from the uniform appearance of the carpet once installed at a customer facility.

3. Renewing the back surface of the refurbished tile makes it practical to refurbish carpet tile that would otherwise be discarded due to the poor condition of the tile backing. This results in fewer rejects and improved process yields which lower the cost for refurbishment.

4. As previously described, the present method and apparatus allow the back surface of the tile to be coated while avoiding build up on the edge of the tile or rejects due to coating materials contacting the pile face yarns of the tile.

A second objective of the invention is to provide product attributes that relate to the performance of the back surface to resist PVC plasticizer. A common disadvantage to PVC backed carpet tile is that chemical plasticizers used to manufacture the backing, can migrate from the backing material and over time interact with installation adhesives and certain flooring materials. Time consuming and expensive floor preparation is needed prior to installing new PVC tile. The new backing layer applied to back surface of the tile is highly resistant to these chemical plasticizers, thereby making it possible to avoid these added costs.

Additional Benefits and Advantages

1. The new backing layer forms a barrier layer against chemical plasticizers, thereby making it possible to avoid expensive floor preparation prior to re-installing refurbished PVC carpet tile.

2. The new backing layer is highly resistant to steam and water; making it possible to dye refurbished tile by conventional dyeing methods.

3. The new backing layer is compatible with commonly used carpet tile installation adhesives.

4. The new layer is low in VOC and meets industry standards for indoor air quality 5. The new layer bonds to all known commercially used carpet tile backing including polypropylene and PVC.

Additional Variations of Alternatives

1. The back surface maybe renewed prior to the refurbishment process of the front of the tile.

2. Other methods may be used to cure or cross-link the acrylic polymer, to include UV, IR, steam plates or Microwave devices.

3. The acrylic polymer may be applied with a single applicator, or applied with intermediate drying between the individual application steps.

4. Other suitable applicators may be used to apply the acrylic coating material, including rod, engraved roll applicators and knife over roll applicators, either a single applicators or used in series.

5. Other acrylic polymers and cross-linking agents may provide similar or like results. Certain polyurethane polymers may be suitable for the backing renewal of used carpet tile.

6. Different thickness and weights of material may be applied to the back surface of the tile with similar results, largely depending on the carpet tile construction, type of applicators and coating material.

The chemical composition and properties of the acrylic material applied to the back surface is described in more detail below. Information is provided describing the test procedures and evaluation results as it relates to the product attributes of the renewed surface.

Polyvinylchloride (PVC) is a widely used plastic and commonly used as a backing material for carpet tile products. Flexible PVC, typical for carpet tile backing, is made using a range of types and amounts of plasticizers. Plasticizers soften the normally ridged PVC, providing the desired degree of flexibility needed for making carpet tile products. However, the chemicals used as plasticizers are rarely very soluble in PVC and tend to migrate or defuse from the host material into the environment with time. An important consequence is that free plasticizer can chemically interact with sub-flooring materials such as adhesives used for flooring installation with adverse effects after carpet tile installation. From a cosmetic standpoint, plasticizers commonly absorb stains and migrate back into the surface of the carpeting along with the staining substance. The stains are visible and can not be easily removed or cleaned, as such the PVC backed carpet tile requires replacement.

The problem of plasticizer migration is particularly acute when PVC backed carpet tile is installed over certain adhesives commonly used for VAT/VCT hard tile surfaces. Chemical interactions between free plasticizers and the VAT/VCT adhesives may cause the PVC carpet tile to strongly bond to the existing sub-floor. To avoid the potential for costly and time consuming work to remove old PVC back tiles when replacing carpet, extensive floor preparation is needed to remove old flooring adhesives before installing new PVC backed carpet tile.

One object of the present invention is to apply a chemically modified acrylic material as a coating to the back surface of a new or refurbished carpet tile as a thin surface layer to protect the back surface against plasticizer and additive migration. Since many carpet tile backings are commonly composed essentially of plasticized PVC compounds, therefore a further object is to provide a plasticizer resistant protective layer to prevent leakage of plasticizer or additive chemical from the PVC carpet tile body into the joining sub-flooring or flooring adhesive. A further object is to provide a carpet tile product with a protective coating since PVC plasticizers may be viewed as environmentally unwanted or unsafe.

The modified coating of the present invention is crosslinked with the result that leakage of plasticizer and additives from the plasticized substrate is substantially prevented when the tile backing is placed in contact with liquids, typically flooring adhesives, which would normally extract the plasticizer and/or additives. The specific methods and apparatus are described in detail above.

The coating material that is applied on the back surface of the carpet tile, previously described as a modified acrylic polymeric compound, is described in more detail below.

Accelerated Aging Test

The following test was used to evaluate the resistance of the present coating to plasticizer migration. The protocol is commonly referred to as an Accelerated Aging Test, and represents a method to measure the effects of the aging process for PVC backed carpet tile.

1. Coated PVC backed carpet tiles are cut into 9"×9" squares. Samples are prepared placing two (2) carpet squares back to back. A second set of samples is prepared placing two (2) squares back to face. A one (1) Kilogram weight is placed on top of each sample set.

2. Each sample set is placed in a conventional laboratory oven maintained at 120° F. for a period of twenty-one days.

3. The samples are removed from the oven and evaluated for evidence of staining, chemical reactions or bonding between the individual layers that would result due to plasticizer migration.

Fastness to Steaming

Coated carpet tiles are placed in an atmospheric steam box at 212° F. (saturated) for 8 minutes. The backing is inspected for delamination of the applied coating layer. Standard ATCC wet and dry crock fastness tests are used to further evaluate the performance and survivability of the new-coated layer.

Exemplary Backing Renewal Process

The process and procedures apply to renewing the back surface of used carpet tile for both cut pile and tufted loop pile carpet tile. The original backing may be composed either of PVC or Polypropylene. The carpet tile products may be of any size or construction, but are typically 18"×18" or 36"×36" square.

1. Tiles are loaded face up on the conveyor. Depending on product construction and weight, the used tiles are washed (re-textured) at 400–800 psi and conveyed to vacuum extractor.

2. Water is extracted through three (3) individual vacuum slots—residual moisture of 43% w.o.f., the re-textured tile is conveyed to a drying oven.

3. The re-textured tile is dried to moisture content of approximately 8% and cooled ambient temperature. The dried tile is rotated or flipped, such that the pile yarn faces down on the conveyor. The re-textured tile is conveyed to a top roll application.

4. A thin layer, approximately 1.0 mm thick of modified acrylic coating material is applied to the back surface of the re-textured tile. The re-textured/coated tile is immediately conveyed to a second top roll applicator were a second layer of material is applied to the back surface of the tile, thereby increasing the thickness of coated material to approximately 2.00 mm with a total weight of approximately 1.0–1.5 oz per square yard.

5. The re-textured/coated tile is conveyed to a drying oven, where drying and cross-linking of the acrylic polymer occurs. The tile is conveyed to a cooling section; therein the temperature of the backing is cooled to ambient temperature.

In accordance with the present invention, the recycled or refurbished used carpet tile is substantially 100% post consumer recycled product, except for the thin backing layer or layers. The process of the present invention is usable on all Milliken brand carpet bases, is usable on PVC, non-PVC and cushioned bases, is usable in connection with nylon 6 and nylon 6, 6 tufted or bonded carpet, is environmentally friendly and provides and economic plus due to the fact that as much as 80% of the final material cost of a textile product or carpet product is in the formation of the original substrate. Further, the process of the present invention lets consumers know that the carpet, carpet tile, or the like can be dealt with in the future, recycled, refurbished, and reused. Also, the process of the present invention does not require the used carpet to be ground up to be recycled and as such, reduces energy requirements.

As shown in FIG. 15 of the drawings and in accordance with the present invention, a new or refurbished carpet flooring, carpet, carpet tile, or the like includes a tufted or bonded primary carpet, a cushion layer, and a backing layer.

Alternatively, the flooring, carpet, carpet tile, or the like may include a tufted (or bonded) primary carpet, a reinforcing layer, and a backing layer.

The process of the present invention is especially suited to adding a backing or coating layer to PVC carpet tile in order to produce a new or refurbished PVC carpet tile product which does not suffer from the drawbacks of conventional PVC carpet tile, is environmentally friendly, and the like.

In accordance with one example of the present invention, the preferred coating material is CTI-2779 produced by Chemical Technology, Inc. of Detroit, Mich. and which is a water-born yellow coating having a good block resistance and plasticizer, excellent water resistance, does not contain any volatile organic compounds (VOC), and withstands at least 6 minutes direct impingement of low pressure steam.

Specification Data:

| | |
|---|---|
| Adhesive Base: | Acrylic |
| Color: | yellow |
| Solids: | 40–45% |
| Viscosity: | 3,000–5,000 cps |
| Weight/gallon: | 7.5–8.5 lbs |
| pH: | 7.0–10.0 |
| Freezing Sensitivity: | Do not freeze |

This coating material can be applied by roll coat, airless or air assisted spray equipment, or the like. Also, this material has a pleasant odor, a slow evaporation rate, is stable, and is safe to use.

With respect to FIG. 16 and in accordance with another embodiment the present invention, prior to washing and re-texturing, the pile face yarn may be steam-bulked, and then chemically treated to achieve a uniform color and appearance between individual tiles, higher product yields and to expand product capability. The present invention as described below involves certain non-obvious and novel uses of proprietary chemical and dyeing methods.

As will become apparent from the following description, the present invention recognizes and addresses at least some of the disadvantages or problems with the prior refurbishment of carpet tile. The present invention makes improvements to U.S. Pat. No. 5,381,592, Method to Refurbish Carpet Tiles and U.S. Pat. No. 5,457,856, Apparatus to Refurbish Carpet Tile; assigned to Milliken Research Corporation, dated Jan. 17, 1995 and Oct. 17, 1995 respectively and hereby incorporated by reference.

Improved Method to Refurbish the Carpet Tile Face

The used carpet tile is steamed and the face yarns pre-bulked prior to using the above mentioned methods and apparatus to clean and re-texture the yarns. After washing, the re-textured yarns are chemically treated by applying a cationic, water soluble, polymeric organic compound and dried in an oven to uniform moisture content. After drying, the surface pile yarn is sheared to a uniform and level height, and the tile edges are trimmed or sheared to make the tile square. A pattern jet dye machine is used to apply new dye colors or pattern. The tile is next steamed, washed and dried using conventional methods. Thereafter, the back of the title may be coated as described above.

Apparatus to Refurbish the Carpet Tile Face

In a preferred embodiment, the pile yarns are steamed in a conventional textile steamer. A non-contact applicator (Millium™) is used to apply an aqueous solution containing a cationic polyacrylamide copolymer to the re-textured pile face yarns. After applying the aqueous solution, the tile is dried in a conventional textile oven prior to dyeing.

New dye colors are applied to the pre-treated tile using a jet injection dyeing apparatus such as set forth in U.S. Pat. No. 3,969,779 hereby incorporated by reference. The dye is applied and the tile is then passed through a conventional steamer where the dyes are fixed on the pile fibers. After leaving the steam chamber, the tile is conveyed through a washer to remove excess dyeing chemicals, and next through a conventional forced hot air oven for drying and next to a back coater and/or to a suitable delivery and take up means.

While various methods and apparatus for cleaning and reconditioning articles with pile fibers may be used, the preferred methods and apparatus are described in U.S. Pat. Nos. 5,381,592 and 5,457,845. Also, by washing and re-texturing of the pile face yarns, carpet tile is reused, thereby to avoid the expense for the replacing used carpet with new carpet. The present methods and apparatus have been shown to be effective in removing dirt and/or matting of pile face yarn, and thereby provide a means to refurbish used carpet tile.

In the past, refurbished carpet tile has not gained wide acceptance for use as a commercial floor covering. One drawback to the prior refurbished carpet tile is that visible differences in color and appearance often remained in the carpet tile after the refurbishment treatment. The yield of commercially acceptable product, tiles that are consistent in color and appearance to each other, was often low. Depending on the age and condition of the used carpet tile prior to treatment, yields of acceptable product typically ranged from 20–40%. The low yield was a disadvantage and often too low to make the prior refurbishment economics viable.

It is generally suggested that new dye color can be applied to refurbished carpet tile to overcome these differences in appearance and color. Refurbished carpet tile, otherwise cleaned and sheared, can be overprinted and brightened. While this approach would result in a better quality refurbished carpet tile and offer the advantages of higher product yields and lower cost, conventional or normal textile dyeing methods fail to produce uniform dye colors and overcome this drawback.

A second drawback is the high cleaning pressure employed for cleaning the pile yarn may make the prior methods unpractical for many carpet tile constructions found in today's commercial market. In particular, this is true for carpet tiles where woven primary substrates are used for tufting, a practice common in today's carpet industry. The problem occurs due to the high water pressure employed to clean and re-texture the pile yarn. The high pressure cleaning solution often displaces pile yarn from the carpet tile or causes the face yarn to separate from the tile backing. In particular, the tile edges are a problem. The high pressure cleaning liquids often damage or permanently deform the edges of the tile. The above conditions cause the refurbished tile to be unusable as commercial floor covering. In a practical sense, the drawback lies with the apparatus which supplies cleaning solution directed at the carpet tile at a pressure of at least 800-psig, which strictly limits the type carpet tile and weight of pile yarns suitable for the prior refurbishment process.

Another disadvantage to prior refurbishment processes result from requirements imposed by the commercial carpet market trade. As such, used carpet tiles may raise general health and hygiene concerns when used for commercial applications. The prior art provides no means to sanitize the carpet or otherwise treat the tile for microbial or biological material; conditions common to used carpet tile. As previously noted, the prior art does not provide a suitable method and apparatus to clean or otherwise recondition the back surface of the used carpet tile. This can also be a source of microbial and/or biological materials, and thereby also a concern.

Other disadvantages and drawbacks to prior art, as well as advantages and benefits of the present invention will become apparent in the following disclosure.

It is one object of this invention to provide an improved process to refurbish used carpet tile. The particular object of improvement is to provide a method to overcome or at least address the prior art problem where individual tiles have a different color and appearance after being refurbished, thereby making the carpet generally acceptable for normal commercial use as a floor covering. In this respect, a second object of improvement is to provide a method and/or apparatus to sanitize used tile or otherwise chemically treat tile to eliminate active microbial or other biological agents. Other objects of improvements are to provide a method and apparatus to refurbish carpet tiles that are otherwise not practical using the prior art. In particular, carpet tile where the pile yarn is tufted into a woven primary. Other improvement and advantages will become apparent from the following description.

Reducing or Eliminating Differences in Color and Appearance Between Individual Tiles As previously suggested a practical approach to overcome the problem of differences in color and appearance between individual refurbished tile is to apply new colors or patterns to the pile face yarn. Textile materials and articles such as carpet tile have been brightened, patterned or otherwise colored using numerous processes, such as yarn dyeing, transfer or screen printing and jet dye machine, with good results. While such prior dyeing processes have met with success, problems have nevertheless been encountered when attempting to dye refurbished carpet tile.

One major reason for the above problem is that refurbished tile may not uniformly accept dye solutions. The problem occurs when dye solutions are applied to the refurbished pile yarn. The rates of dye absorption (uptake) for refurbished tile may differ between individual tiles and often for different areas within the same tile. As a result, dyestuffs may not be uniformly distributed through the pile yarn, and therefore the pile face yarns dye to different apparent colors and shades of color, largely determined by the dye absorption rate. Again, there may be visible differences in color and appearance between individual refurbished tiles.

It is now found that differences in pile yarn texture remain in the carpet tile after the washing and re-texturing, and are one cause for the above-mentioned differing rates of dye absorption and reason for individual refurbished tiles to dye to different color and appearances. Other contributing factors are related to chemicals that remain in the carpet tile after treatment. The chemicals include common fluoropolymer dispersed compounds or stain blocking agents applied during the original tile manufacturing process as carpet protectors, and various other chemicals used to clean and maintain carpet tile through its lifecycle.

As described by T. McBride and T. Godfrey, "Process for Pattern Dyeing of Textile Material", certain anionic and cationic compounds applied to textile materials form water-insoluble skins (in-situ) around individual dye droplets dye solutions which contain other selected anionic or compound. One object of present invention is to improve the sharpness of pattern color applied by a jet dye machine and otherwise avoid the use of anti-migration agents that have restrictive uses for textile dyeing.

It has been discovered that the rate of dye absorption (uptake) can be made uniform for refurbished tile by chemically pre-treating the tile prior to dyeing with a solution containing a cationic polyacrylamide copolymer. The result is that when dye solutions, containing selected anion components, are applied to re-textured piles; the solution are absorbed at a uniform rate. Thereby, the dyestuff are uniformly distributed through the pile yarn and the carpet tile dyes to the same color and appearance. It is believed that the same general ionic interactions described by McBride and Godfrey are also useful to control the absorption rate, and therefore also provide a unique and novel use for their methods, not contemplated in the original disclosure. In particular, this is true as it regards re-textured pile yarn and refurbished carpet tile. The same types of ionic interaction control the adsorption rates for dye solutions applied to re-textured tiles, and therefore provide a unique or novel use for this chemistry.

Steaming to Pre-Bulk Yarns Prior to Washing/Re-Texturing

Numerous textile processes use steam chambers or other steam apparatus to condition yarns and pile fabric, or for other purposes related to a textile process and product. As described by H. Muller and H. Gallagher, U.S. Pat. No. 4,301,577, Process for Treating Tufted Pile Fabrics, one use of a steam chamber is to erect pile yarn that has been bent, matted or crushed during processing. In accordance with one technique, heating carpet in a steam chamber and through mechanical beating; the surface of textile materials such as carpeting, is improved by eliminating pile yarn defects.

It has now been discovered that like-results can be achieved when refurbishing used carpet tile. Whereby the pile yarn of the carpet tile is heated in a steam chamber and thereafter a high pressure cleaning solution is directed at the carpet tile to create a lifting force to the pile yarn, similar to the forces caused by mechanical beating. It is also found that when this method is used with multiple cleaning devices of the type previously described, it is possible to re-texture pile yarn and remove dirt and/or matting at cleaning pressures in the range of 100–400 psig, significantly lower than with the prior art. In particular, the method is useful to refurbish low pile weight carpet tile and tufted carpet tiles wherein woven primary substrates are used for tufting (previously not practical using the prior art refurbishment processes).

Chemical Treatment of Cleaning Solutions

As previously mentioned, used carpet tiles may raise general health and hygiene concerns when reused for commercial applications. Notwithstanding the improvements previously described which provide sanitation through steam treatment, it is found that the prior process can be improved by including selected biocide and/or fungicide compounds as components of the washing liquid. Thereby, including these agents as components of cleaning liquid reduces the presence of active microbial or biological agent to a level equivalent to new carpet tile. In the preferred embodiment, solution containing Glutaraldehyde (1,5 Pentanedail) and/or 5-cloro-2-methyl-4-isothiazoline-3-one with 2-methyl-4-isothiazonline-3-one are added to the wash solution for this purpose.

The above described improvement provides the following benefits and advantages:

1. The improved method produces a carpet that can successfully be dyed to the same color and appearance. The carpet tile is generally acceptable for commercial floor covering applications.
2. The improved method results in higher product yield than the prior art. Yields of acceptable product are increased from the range of 20–40% to a range of 75–95%.
3. Pre-treatment of the tile prior to dyeing increases dye yield, thereby further improving the economics of the prior method.
4. The improved method can successfully be used to refurbish carpet tile construction not previously practical with the prior art.
5. The improved method provides a refurbished carpet tile equivalent to new carpet in regards to active biological or microbial agents and/or materials.
6. The improvements provide a method whereby carpet tile can be refurbished using lower pressure, and also provide additional efficiencies and product capabilities.
7. The improvements provide a method to produce tiles with essentially square edges.

Contemplated Variations or Alternatives

1. The used carpet tile may be steamed or pre-bulked immediately after washing and re-texturing, notwithstanding that this option is not preferred.
2. As concerns the chemical pre-treatment prior to dyeing, other cationic compounds as generally described in the referenced patent, may be used to achieve similar results. Likewise, other chemical applicator may be used to apply the cationic compound, notwithstanding that the optimum results require the use of a non-contact applicator of the type that disperses a fine or atomized spray.
3. Other dyeing or pattern printing methods may be used to apply new dye colors and/or patterns, notwithstanding the optimum results are achieved through the use of a jet dye machine as previously described.

Average Tile Thickness (Inches)

| PRODUCT | PRODUCT | | TOTAL YARN PILE | | PILE HEIGHT |
| --- | --- | --- | --- | --- | --- |
| | BEFORE | AFTER | BEFORE | AFTER | % INCREASE |
| Cut Pile | 0.2375 | 0.3250 | 0.1125 | 0.2000 | +77.8 |
| Bonded Tufted Loop Pile | 0.2438 | 0.3000 | 0.1188 | 0.1750 | +47.5 |

In practice, the process works well for products within the range of 0.2000–0.4250 inches tile thickness, which covers about 95%+ of the normal thickness range for commercial carpet tiles. Also, the pile face yarns may be chemically treated with reducing or oxidizing agents, such as bleaching agents, to whiten the pile face prior to pattern jet dyeing or printing.

As has been herein described, a method and apparatus have been described which will allow dirty and matted carpet tiles to be refurbished by the treatment of high pressure water and thereby increase the service life of the carpet tiles, thereby eliminating the additional expense of purchasing new pile carpet tiles and/or rugs. It can readily be seen that the herein-described invention provides an economic saving to the user of the described method and apparatus. Furthermore, since used carpet tiles are being refurbished rather than thrown away, this invention substantially reduces the amount of carpet and carpet tiles that has to be treated in landfills and other areas of disposal, which in turn helps save our environment.

The preferred embodiment of the invention has been described and modifications of same may be made within the scope of the invention and it is therefore requested that the invention be limited by the scope of the claims.

What is claimed is:

1. In a method of refurbishing used carpet tiles, the improvement comprising steam bulking and then chemically treating the carpet tile prior to washing and retexturing the pile face yarn to achieve a uniform color and appearance between individual carpet tiles when the refurbished carpet tiles are dyed, wherein said chemical treatment includes applying a cationic, water-soluble, polymeric organic compound.

2. The method as recited in claim 1, further comprising the steps of drying the bulked and chemically treated carpet tile in an oven to uniform moisture content, shearing the surface pile yarn to a uniform and level height, trimming the tile edges to make the tile square, pattern jet dyeing to apply new dye colors or patterns, steaming, washing and drying the dyed carpet tile.

3. The method as recited in claim 2, further comprising the step of coating the back of tile with a thin polymer coating prior to or following pattern jet dyeing, steaming, washing, and drying of the carpet tile.

4. A refurbished carpet tile produced by the process of claim 3.

5. A method of refurbishing cut or loop pile carpet products, comprising the steps of:

steaming and prebulking face yarns of the pile carpet product, washing the pile carpet product by projecting a stream of cleaning liquid against the face yarns of the pile carpet product to clean dirt therefrom, chemically treating the face yarns of the pile carpet product by applying a cationic, water-soluble, polymeric organic compound, drying the pile carpet product in an oven to a uniform moisture content, shearing the surface yarn of the face to a uniform level height, trimming the edges to make the pile carpet product square, pattern jet dyeing the pile carpet product to apply new dye colors or pattern, and then steaming, washing and drying the dyed pile carpet product.

6. The method as recited in claim 5, further comprising the step of coating the back of the pile carpet product with at least one thin layer of polymer coating.

7. A refurbished pile carpet product produced by the method of claim 6.

* * * * *